United States Patent
Kotani

(10) Patent No.: US 9,350,898 B2
(45) Date of Patent: May 24, 2016

(54) DISPLAY CONTROL APPARATUS, CONTROL METHOD THEREOF, AND RECORDING MEDIUM

(71) Applicant: CANON KABUSHIKI KAISHA, Tokyo (JP)

(72) Inventor: Junji Kotani, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/748,944

(22) Filed: Jun. 24, 2015

(65) Prior Publication Data

US 2015/0381850 A1 Dec. 31, 2015

(30) Foreign Application Priority Data

Jun. 27, 2014 (JP) ................................ 2014-132817

(51) Int. Cl.
*G06F 3/12* (2006.01)
*H04N 1/32* (2006.01)
*H04N 1/42* (2006.01)
*H04N 1/00* (2006.01)
*G06K 15/00* (2006.01)

(52) U.S. Cl.
CPC ....... *H04N 1/32523* (2013.01); *H04N 1/00204* (2013.01); *H04N 1/00267* (2013.01); *H04N 1/00413* (2013.01); *H04N 1/00485* (2013.01); *H04N 1/42* (2013.01); *H04N 2201/0094* (2013.01)

(58) Field of Classification Search
None
See application file for complete search history.

(56) References Cited

U.S. PATENT DOCUMENTS

2006/0215198 A1* 9/2006 Yorimoto ............... G06K 15/02 358/1.13
2010/0073705 A1* 3/2010 Cain ................... H04N 1/00222 358/1.15

FOREIGN PATENT DOCUMENTS

JP 2010-258721 A 11/2010

* cited by examiner

*Primary Examiner* — Dov Popovici
(74) *Attorney, Agent, or Firm* — Canon U.S.A., Inc., IP Division

(57) ABSTRACT

An apparatus control method includes receiving an image, displaying the received image, presenting candidates for a printing device to be allowed to print the displayed image, selecting at least one of the presented candidates for the printing device, and transmitting, to the selected printing device, an instruction to print the displayed image. When the candidates for the printing device include a printing device that transmitted the image, the printing device that transmitted the image is presented in preference to the other printing devices.

11 Claims, 14 Drawing Sheets

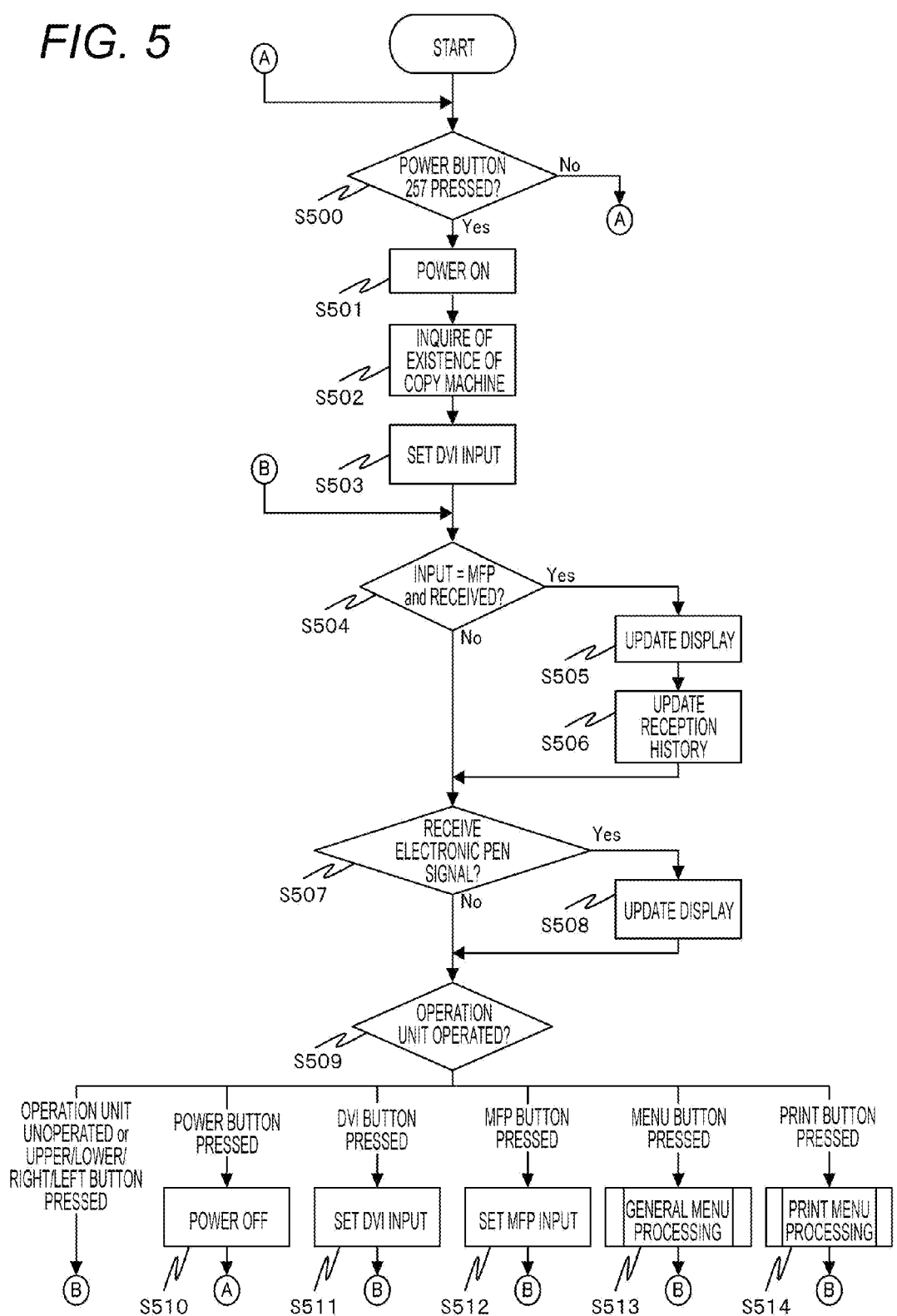

DISPLAY CONTROL APPARATUS, CONTROL METHOD THEREOF, AND RECORDING MEDIUM

BACKGROUND

1. Field

The present disclosure relates to a display control apparatus communicable with an external device.

2. Description of the Related Art

Recently, an MFP (multifunction printer) is widely used. An MFP is a printer composite machine having multiple functions such as a copy function, a print function, and a document scanning function.

Meanwhile, a display apparatus capable of displaying an image on a large screen, such as a projector, is also widely used. By using such a display apparatus, it is possible to see the same document or presentation material in a multi-participant conference.

Further, it is more convenient if an MFP and a projector are connected to a network so as to exchange image data. Two use cases will be exemplary shown. One is a case of holding a multi-participant conference while there is only a paper document. In that case, by scanning a paper document using an MFP and transmitting the data to a display apparatus and displaying it, it is possible to utilize the benefit of a large screen display. The other is a case where writing is made on a displayed image with an electronic pen connected to the display apparatus in a conference or the like. A participant may wish to take back such a material after the conference. In that case, by transmitting image data and data written by the electronic pen from the projector to an MFP and printing them, a participant is able to take a paper medium back.

One problem involved in exchanging image data between an MFP and a projector connected to a network is as follows: that is, if there are a number of communication partners, selecting an appropriate partner from multiple options imposes a burden on a user.

To cope with this problem, Japanese Patent Application Laid-Open No. 2010-258721 discloses a technology in which a key is acquired by a projector and is transmitted to a complex machine, and the option representing the projector having a key matching the key input in the complex machine is highlighted.

SUMMARY

Aspects of the present disclosure include a display control apparatus including a reception unit configured to receive an image, a display control unit configured to perform control to display the image received by the reception unit, a presentation unit configured to present candidates for a printing device to be allowed to print a displayed image, a selection unit configured to select at least one of the candidates for the printing device, and a transmission unit configured to transmit an instruction to print the displayed image, to the printing device selected by the selection unit.

When the candidates for the printing device include a printing device that transmitted the image, the presentation unit presents the printing device that transmitted the image in preference to other printing devices.

Further features of the present disclosure will become apparent from the following description of exemplary embodiments with reference to the attached drawings.

BRIEF DESCRIPTION OF THE DRAWINGS

FIG. 5 is a flowchart for explaining operation of a liquid crystal projector.

DESCRIPTION OF THE EMBODIMENTS

Hereinafter, preferred exemplary embodiments of the present technology will be described with reference to the accompanying drawings.

First Exemplary Embodiment

The present embodiment describes a network system using a display apparatus to which the present technology is applied. Further, as an example of a display apparatus, an example using a liquid crystal projector (hereinafter simply referred to as a projector) will be described.

Configuration of Network System

Figure 1:
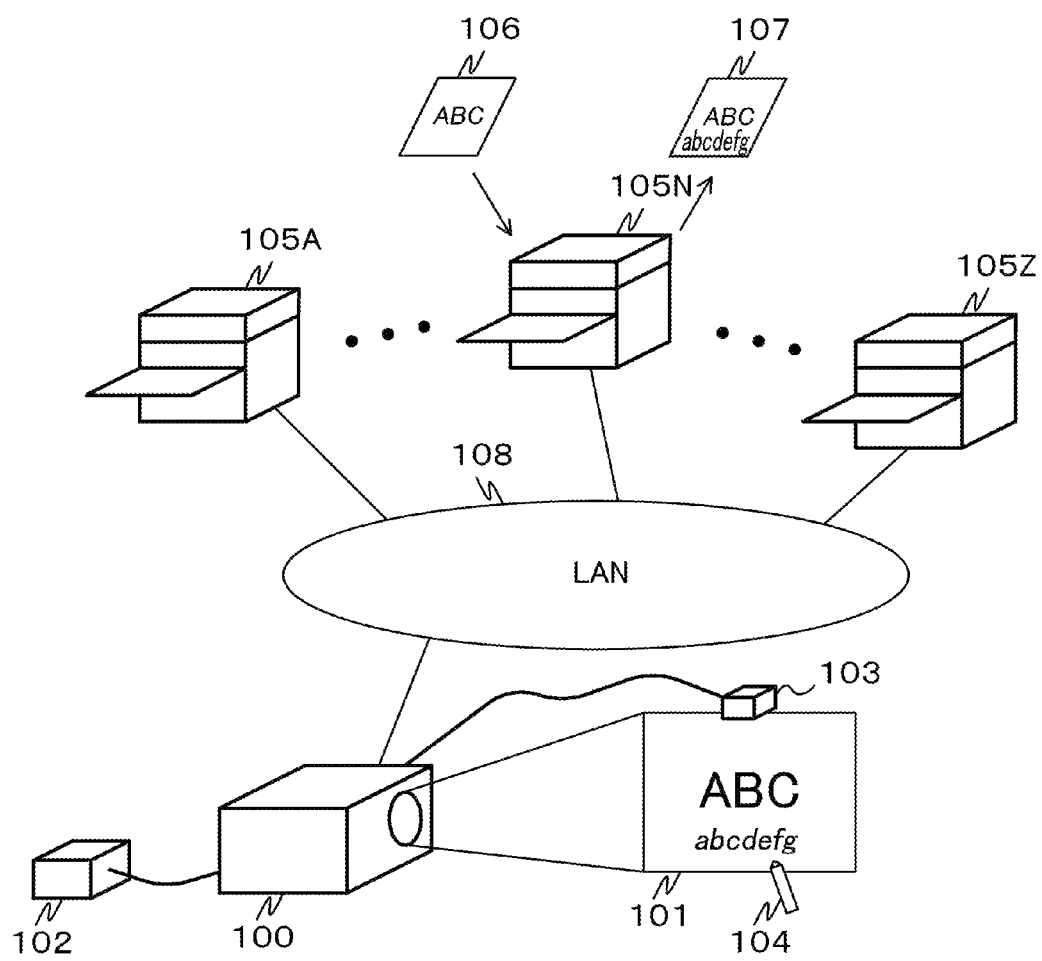
FIG. 1 is a diagram illustrating a configuration of a network system.

Referring to FIG. 1, a configuration of a network system according to the present embodiment will be described.

A projector 100 is connected with an image signal source 102, a LAN (Local Area Network) 108, and an electronic pen light receiver 103. The projector 100 receives image data from the image signal source 102 and from copy machines 105A to 105Z which are external devices through the LAN 108, and projects and displays the data on a screen 101. The projector 100 also realizes a so-called electronic blackboard function which is a function of acquiring a position of an electronic pen 104 on the screen 101 via the electronic pen light receiver 103, and outputting the track thereof as an image.

As the image signal source 102, a device that outputs image signals such as a PC (Personal Computer), a DVD player, or the like, is applicable. In the present embodiment, image data is input from the image signal source 102 to the projector 100 as DVI (Digital Visual Interface) signals.

The electronic pen 104 has a WRITE button, a CLEAR button, and an infrared light emitter. When the WRITE button is pressed by a user, infrared light is emitted from the infrared light emitter. The electronic pen light receiver 103 includes a two-viewpoint camera, and is able to detect a two-dimensional position, on the screen 101, of the electronic pen 104 emitting infrared light. The electronic pen light receiver 103 transmits the detected position of the electronic pen 104 to the projector 100. Further, when the CLEAR button is pressed by a user, infrared light, in which a CLEAR command is applied with PWM modulation, is emitted from the infrared light emitter. When the electronic pen light receiver 103 detects a CLEAR command, the electronic pen light receiver 103 transmits the CLEAR command to the projector 100.

The copy machines 105A to 105Z are so-called MFPs. The copy machines 105A to 105Z are connected with the LAN 108. The copy machines 105A to 105Z are able to scan a document 106 to generate digital data and store it, and output the digital data as a printed material 107. Further, the copy machines 105A to 105Z are able to transmit digital data to another device connected with the LAN 108, through the LAN 108.

As the LAN 108, Ethernet (registered trademark), a wireless LAN, or the like is applicable. Devices (projector 100 and copy machines 105A to 105Z) connected with the LAN 108 are communicable with each other.

Configuration of Projector

Figure 2A:
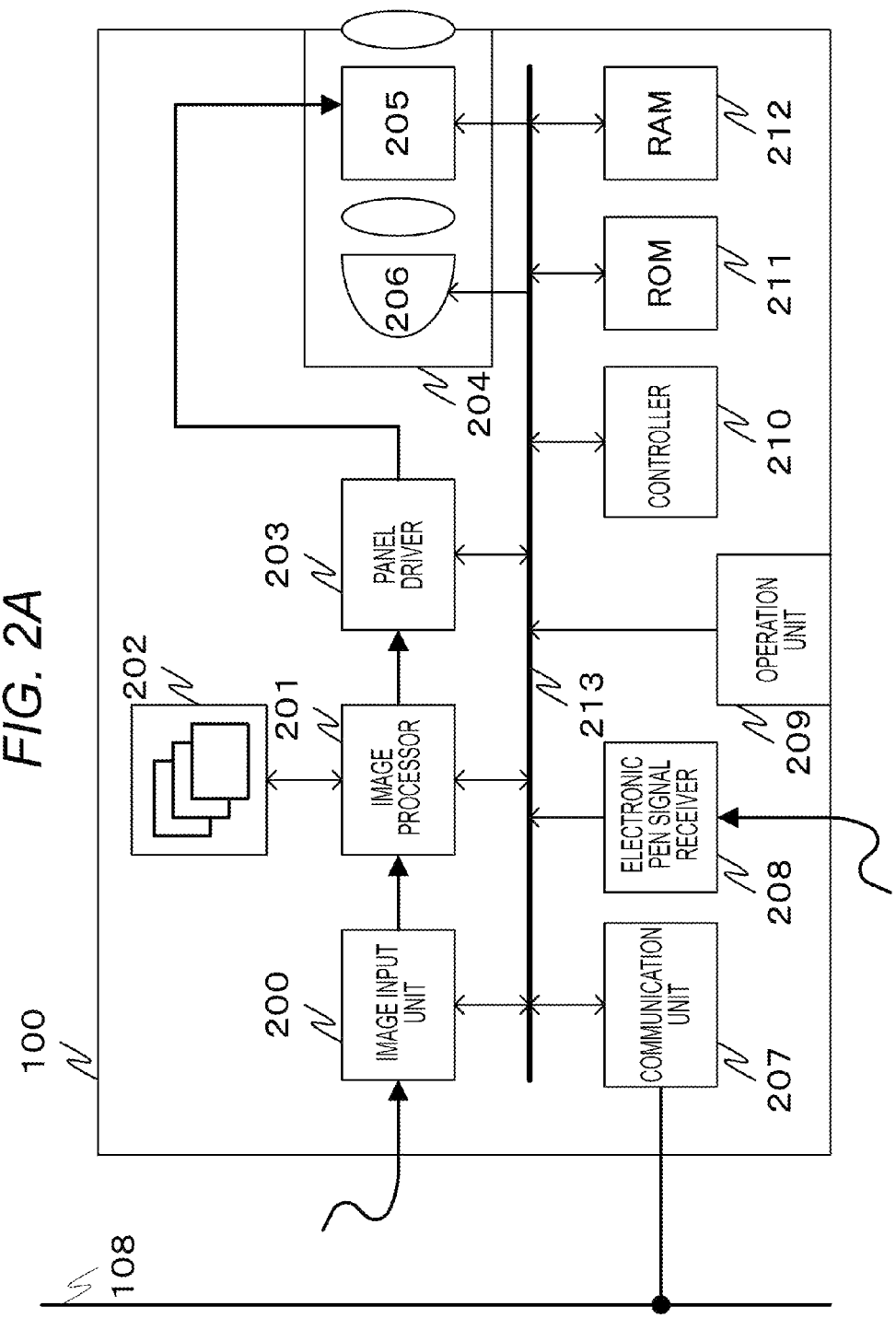
FIGS. 2A and 2B are diagrams illustrating a configuration of a liquid crystal projector.

Referring to FIG. 2A, a configuration of the projector 100 will be described.

An image input unit 200 receives a DVI signal from the image signal source 102, converts image data to be in a format processable by an image processor 201, and outputs it to the image processor 201.

The image processor 201 performs image processing on input image data.

A frame buffer 202 is configured of a volatile memory. The image processor 201 performs processing using the frame buffer 202.

Figure 8:
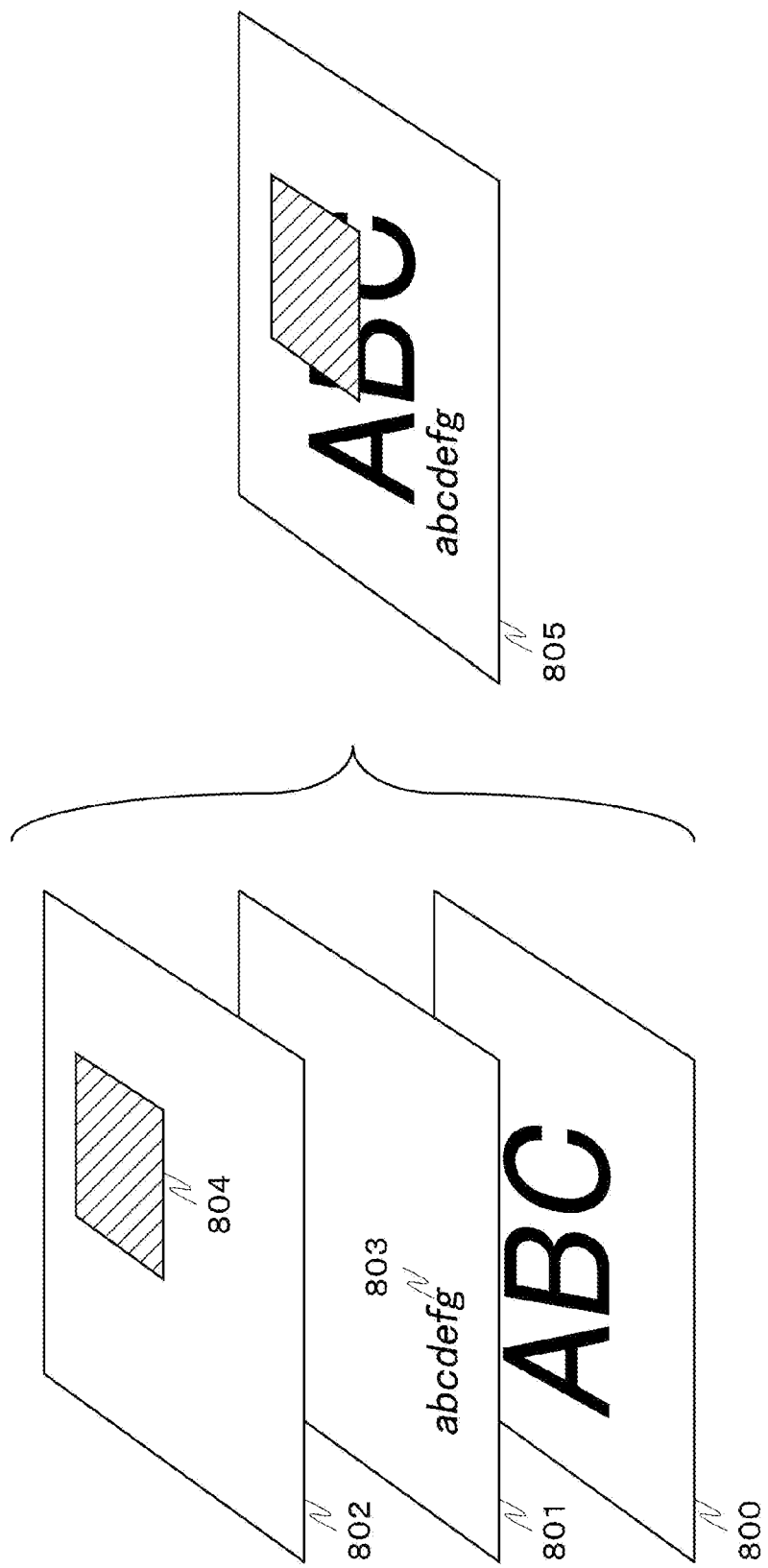
FIG. 8 is a diagram for explaining a layer structure of an image.

Here, processing performed by the image processor 201 will be described with reference to FIG. 8. FIG. 8 conceptually illustrates image data to be stored in the frame buffer 202 by the image processor 201. Image data to be stored in the frame buffer 202 has a hierarchical relationship, in which an image layer 800, an electronic blackboard layer 801, and a menu layer 802 are provided in this order from the bottom.

The image layer 800 is a layer on which a background image is stored. The image processor 201 stores an image, received from the image input unit 200 or a controller 210, on the image layer 800, in accordance with an instruction of the controller 210. Further, when storing an image on the image layer 800, the image processor 201 performs image quality correction such as brightness correction and contrast correction, in accordance with an instruction of the controller 210. FIG. 8 illustrates an example in the case where the image processor 201 receives an image of one frame including an image of "ABC" from the controller 210, in which the image is designated for the image layer 800.

The electronic blackboard layer 801 is a layer on which an image of a track of the electronic pen 104 is stored. The image processor 201 stores an image, received from the controller 210, on the electronic blackboard layer 801 in accordance with an instruction of the controller 210. On the electronic blackboard layer 801, image data having a value (opacity) for each pixel is stored. FIG. 8 illustrates an example in which the image processor 201 receives an image of one frame including a character image 803 of "abcdefg" from the controller 210, in which the image is designated for the electronic blackboard layer 801. In this example, a value of the area of the character image 803 is 100% (opaque), and a value of the other area is 0% (transparent).

The menu layer 802 is a layer on which an OSD (On Screen Display) image such as a menu is stored. The image processor 201 stores an image, received from the controller 210, on the menu layer 802 in accordance with an instruction of the controller 210. On the menu layer 802, image data having a value (opacity) for each pixel is stored. FIG. 8 illustrates an example that the image processor 201 receives an image of one frame including a menu image 804 from the controller 210, in which the image is designated for the menu layer 802. In this example, a value of the area of the menu image 804 is 100% (opaque) and a value of the other area is 0% (transparent).

The image processor 201 performs a composition on the respective images stored on the image layer 800, the electronic blackboard layer 801, and the menu layer 802 while reading them, generates a composite image 805, and outputs it to a panel driver 203 in the latter stage.

Referring back to FIG. 2A, the panel driver 203 converts data of the input composite image 805 into a driving signal for forming an image on a liquid crystal panel 205, and outputs it to the liquid crystal panel 205.

An optical system 204 includes a light source 206, a liquid crystal panel 205, an illumination optical system, and a projection optical system. By the optical system 204, light from the light source 206 is modulated by the liquid crystal panel 205 and is projected outside the projector 100, and an image is displayed on the screen 101.

On the liquid crystal panel 205, an image is formed by a driving signal generated by the panel driver 203. As the liquid crystal panel 205, a transmissive liquid crystal panel or a reflective liquid crystal panel may be used.

As the light source 206, a high pressure mercury lamp, a halogen lamp, or a laser light source may be used.

The controller 210 is able to communicate with the copy machines 105A to 105Z through the LAN 108 via a communication unit 207.

The controller 210 is able to receive a signal from the electronic pen light receiver 103 via an electronic pen signal receiver 208.

An operation unit 209 includes a group of buttons provided on the housing of the projector 100, and is configured to receive an instruction input to the projector 100 from a user existing around and make a notice to the controller 210.

Figure 2B:
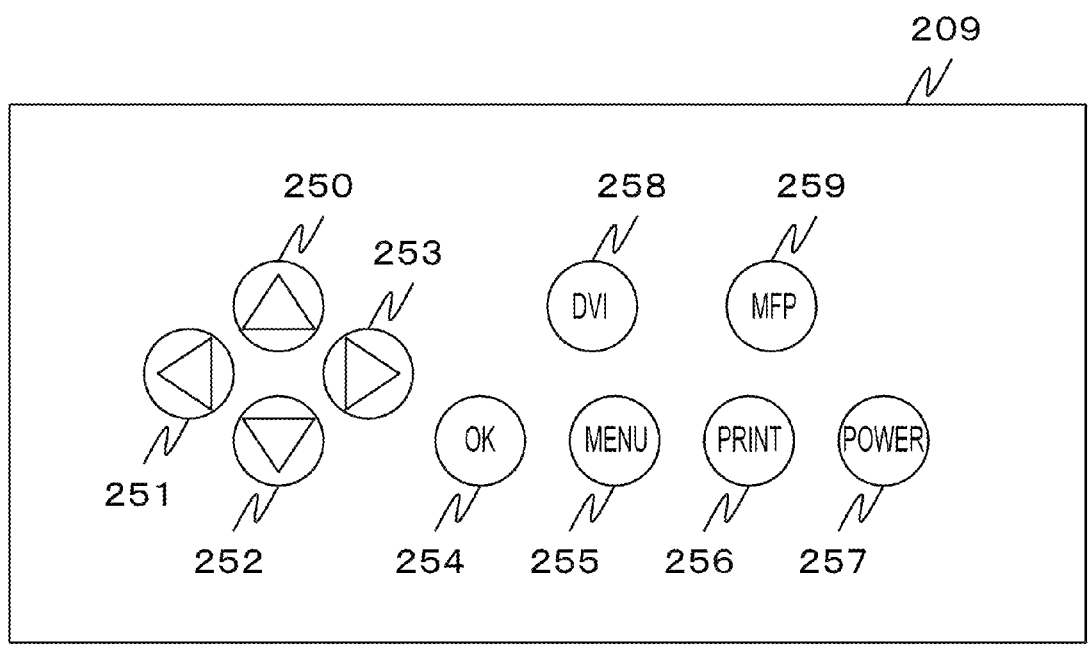

Here, referring to FIG. 2B, a group of buttons constituting the operation unit 209 will be described. An upper button 250, a left button 251, a lower button 252, and a right button 253 are buttons for operating the menu, in particular, for cursor movement, respectively. A determination button 254 is also a button for menu operation, which transmits an intention of determination by a user with respect to the item pointed by the cursor. A menu button 255 is a button for toggling the menu between display and non-display. A print button 256 is a button for instructing printing of a displayed image. A power button 257 is a button for instructing startup and stop of the projector 100. A DVI button 258 and an MFP button 259 are buttons for switching displaying between image data input into the image input unit 200 and image data input through the LAN 108, respectively.

Referring back to FIG. 2A, the controller 210 is configured of a microcomputer, and controls the entire projector 100.

A ROM 211 is a nonvolatile memory, in which program codes and data used for operation of the controller 210 are stored. In the ROM 211, data necessary for operation of the projector 100 is also stored.

A RAM 212 is a volatile memory to be used as a working memory for operation of the controller 210.

The controller 210 is communicable with the image input unit 200, the image processor 201, the panel driver 203, the liquid crystal panel 205, the light source 206, the communication unit 207, the electronic pen signal receiver 208, the operation unit 209, the ROM 211, and the RAM 212, via a bus 213.

Configuration of Copy Machine

Figure 3:
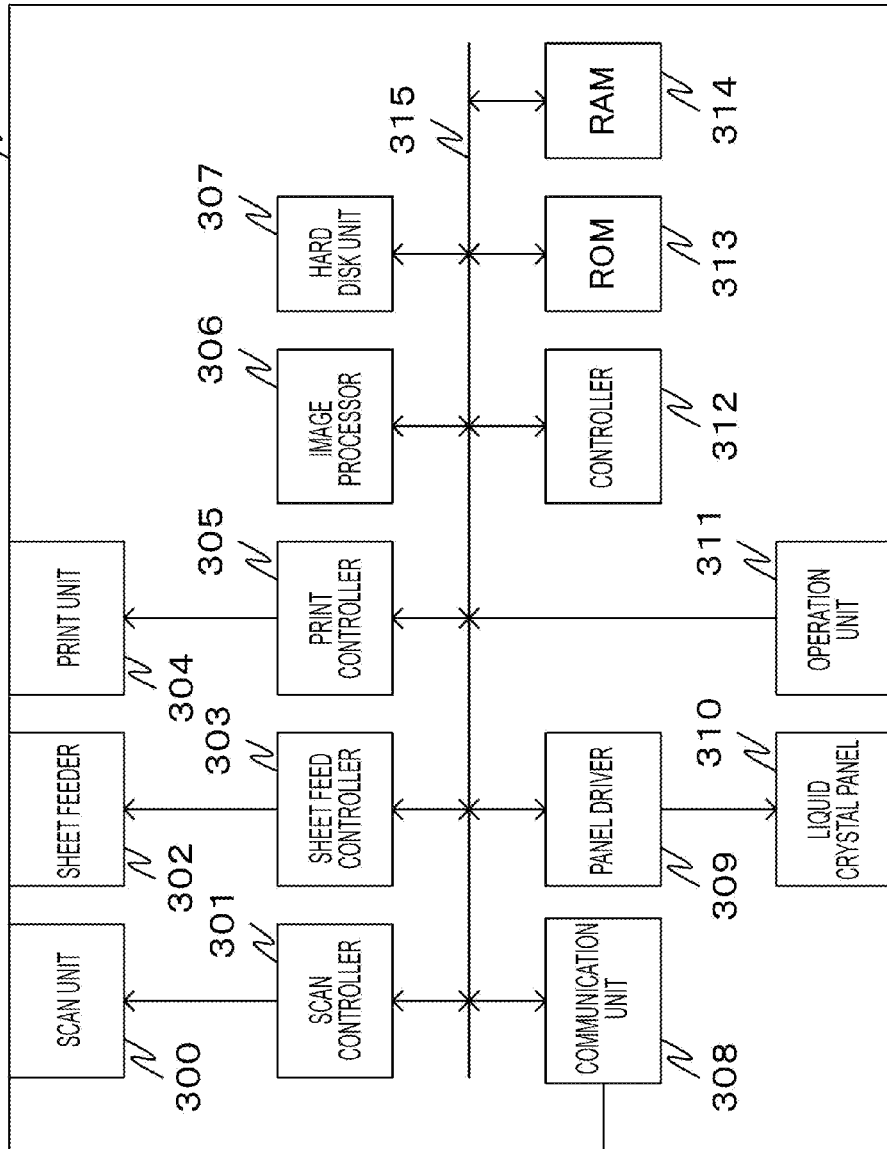
FIG. 3 is a diagram illustrating a configuration of a copy machine.

Referring to FIG. 3, a configuration of each of the copy machines 105A to 105Z will be described. It should be noted that the copy machine may be denoted by a reference numeral 105 in the following description.

A scan unit 300 is a mechanism for reading a sheet document, and includes a light source that illuminates a sheet, and a photoelectric converter that converts reflected light from a sheet into electronic form.

A scan controller 301 controls the scan unit 300 in accordance with an instruction of a controller 312, acquires digital data which is a scan result, and informs the controller 312 of it.

A sheet feeder 302 is a mechanism for conveying a sheet.

A sheet feed controller 303 controls the sheet feeder 302 in accordance with an instruction of the controller 312.

A print unit 304 is a mechanism for performing printing on a sheet conveyed by the sheet feeder 302.

A print controller 305 receives image data from the controller 312, and controls the print unit 304 to print the image.

An image processor 306 performs image processing such as contrast correction on designated image data in accordance with an instruction of the controller 312.

A hard disk unit 307 stores and deletes data in accordance with an instruction of the controller 312. Examples of data instructed to be stored by the controller 312 include digital data obtained by the scan controller 301. The controller 312 is communicable with the projector 100 and other copy machines through the LAN 108 via a communication unit 308.

A panel driver 309 receives an image of an operation UI from the controller 312, and drives a liquid crystal panel 310.

The liquid crystal panel 310 is disposed on the housing of the copy machine 105, and provides information display and status display for operation to a user.

An operation unit 311 includes a group of buttons provided on the housing of the copy machine 105, and is used for inputting an instruction to the copy machine 105 by a user existing nearby, and making a notice to the controller 312. The buttons constituting the operation unit 311 include a button for performing startup and shutdown, a button for starting scanning, a button for starting copying, a button for transmitting scanned data to the outside such as the projector 100, and a button for inputting a destination of the transmission, all of which are not illustrated.

The controller 312 is configured of a microcomputer, and controls the entire copy machine 105.

A ROM 313 is a nonvolatile memory in which program codes and data for operation of the controller 312 are stored. In the ROM 313, data necessary for operation of the copy machine 105 is also stored.

A RAM 314 is a volatile memory used as a working memory for operation of the controller 312.

The controller 312 is communicable with the scan controller 301, the sheet feed controller 303, the print controller 305, the image processor 306, the hard disk unit 307, the communication unit 308, the panel driver 309, the operation unit 311, the ROM 313, and the RAM 314, through a bus 315.

Operation of Projector

Next, operation of the projector 100 will be described with reference to FIG. 5.

When an AC cable, not illustrated, is connected to the projector 100, power is supplied to the controller 210, the bus 213, the RAM 212, the ROM 211, and the operation unit 209, and the controller 210 is started and a flow begins.

At step S500, the controller 210 checks whether or not the power button 257 is pressed by a user. Step S500 is repeated until the power button 257 is pressed.

When detecting that the power button 257 is pressed at step S500, at step S501, the controller 210 supplies power to the entire projector 100. Along with it, the controller 210 performs initialization control of the respective units. Thereby, an image is projected and displayed. At this stage, an optical black image is projected and displayed.

At step S502, the controller 210 broadcasts an inquiry about presence of a copy machine to the LAN 108 via the communication unit 207. As a copy machine connected to the LAN 108 sends back own address and identifier in response to the broadcast, the controller 210 receives them via the communication unit 207. The controller 210 stores a combination of the received address and identifier of the copy machine in the RAM 212. Specific examples of combinations are as shown below.

Address: 192.168.10.1 Identifier: copy machine A
Address: 192.168.10.2 Identifier: copy machine B
. . .
Address: 192.168.10.14 Identifier: copy machine N
. . .
Address: 192.168.10.26 Identifier: copy machine Z At step S503, the controller 210 sets input to DVI. Specifically, the controller 210 instructs the image processor 201 to load image data from the image input unit 200 to the image layer 800. Thereby, image data of a DVI signal from the image signal source 102 is projected and displayed. Along with it, the controller 210 stores in the RAM 212 that the current input is "DVI".

At step S504, the controller 210 determines whether or not the current input is "MFP" and the image data reached the communication unit 207 from any of the copy machines 105A to 105Z. If the determination is true, the processing proceeds to step S505. If the determination is false, the processing proceeds to step S507.

If the determination is true at step S504, at step S505, the controller 210 receives the image data reached the communication unit 207, and instructs the image processor 201 to load the data onto the image layer 800. Thereby, image data received from any of the copy machines 105A to 105Z is projected and displayed.

At step S506, the controller 210 additionally stores the identifier of the copy machine from which the image data displayed at step S505 is transmitted, in the reception history of the RAM 212. Then, the processing proceeds to step S507.

If the determination is false at step S504, or after step S506, at step S507, the controller 210 determines whether or not track data of the electronic pen 104 or a CLEAR command reached the electronic pen signal receiver 208 from the electronic pen light receiver 103. If the determination is true, the processing proceeds to step S508. If the determination is false, the processing proceeds to step S509.

If the determination is true at step S507, at step S508, the controller 210 receives track data or a CLEAR command reached the electronic pen signal receiver 208. If the controller 210 receives track data, the controller 210 converts it to image data, and instructs the image processor 201 to load the image data to the electronic blackboard layer 801. Thereby, image data of the track of the electronic pen 104 is projected and displayed. Meanwhile, if the controller 210 receives a CLEAR command, the controller 210 generates transmissive image data, and instructs the image processor 201 to load the image data to the electronic blackboard layer 801. Thereby, display of the image data of the track of the electronic pen 104 is erased. Then, the processing proceeds to step S509.

If the determination is false at step S507, or after step S508, at step S509, the controller 210 determines whether or not any operation is made by a user to the operation unit 209.

At step S509, if it is determined that no operation is made by a user to the operation unit 209, the processing proceeds to step S504.

If it is determined that the power button 257 is pressed at step S509, the processing proceeds to step S510. At step S510, the controller 210 cuts off power supply except for that of the controller 210, the bus 213, the RAM 212, the ROM 211, and the operation unit 209. Thereby, projection and display end. Further, the controller 210 clears the reception history on the RAM 212. Then, the processing proceeds to step S500.

If it is determined that the DVI button 258 is pressed at step S509, the processing proceeds to step S511. At step S511, the controller 210 sets input to DVI. This processing is similar to the processing of step S503. Then, the processing proceeds to step S504.

If it is determined that the MFP button 259 is pressed at step S509, the processing proceeds to step S512. At step S512, the controller 210 sets input to MFP. Specifically, the controller 210 instructs the image processor 201 not to load image data from the image input unit 200 to the image layer 800. Further, the controller 210 instructs the image processor 201 to load image data of the optical black image to the image layer 800. Along with it, the controller 210 stores that the current input is "DVI" in the RAM 212. Thereby, the optical black image is projected and displayed at the current stage, and reception of image data from any of the copy machine 105A to 105Z is waited. When image data is received, the determination is true at step S504, and the image is displayed at step S505.

Then, the processing proceeds to step S504.

If it is determined that the menu button 255 is pressed at step S509, the processing proceeds to step S513. At step S513, the controller 210 displays a general menu exemplary illustrated in FIG. 9, and allows a user to input a setting value of the projector 100. Further, based on the input setting value, the controller 210 applies the setting to the respective units of the projector 100. This processing will be described below in detail. Then, the processing proceeds to step S504.

If it is determined that the print button 256 is pressed at step S509, the processing proceeds to step S514. At step S514, the controller 210 displays a print menu, allows a user to designate a print destination, and transmits a print request to the print destination. This processing will be described below in detail. Then the processing proceeds to step S504.

Figure 6A:
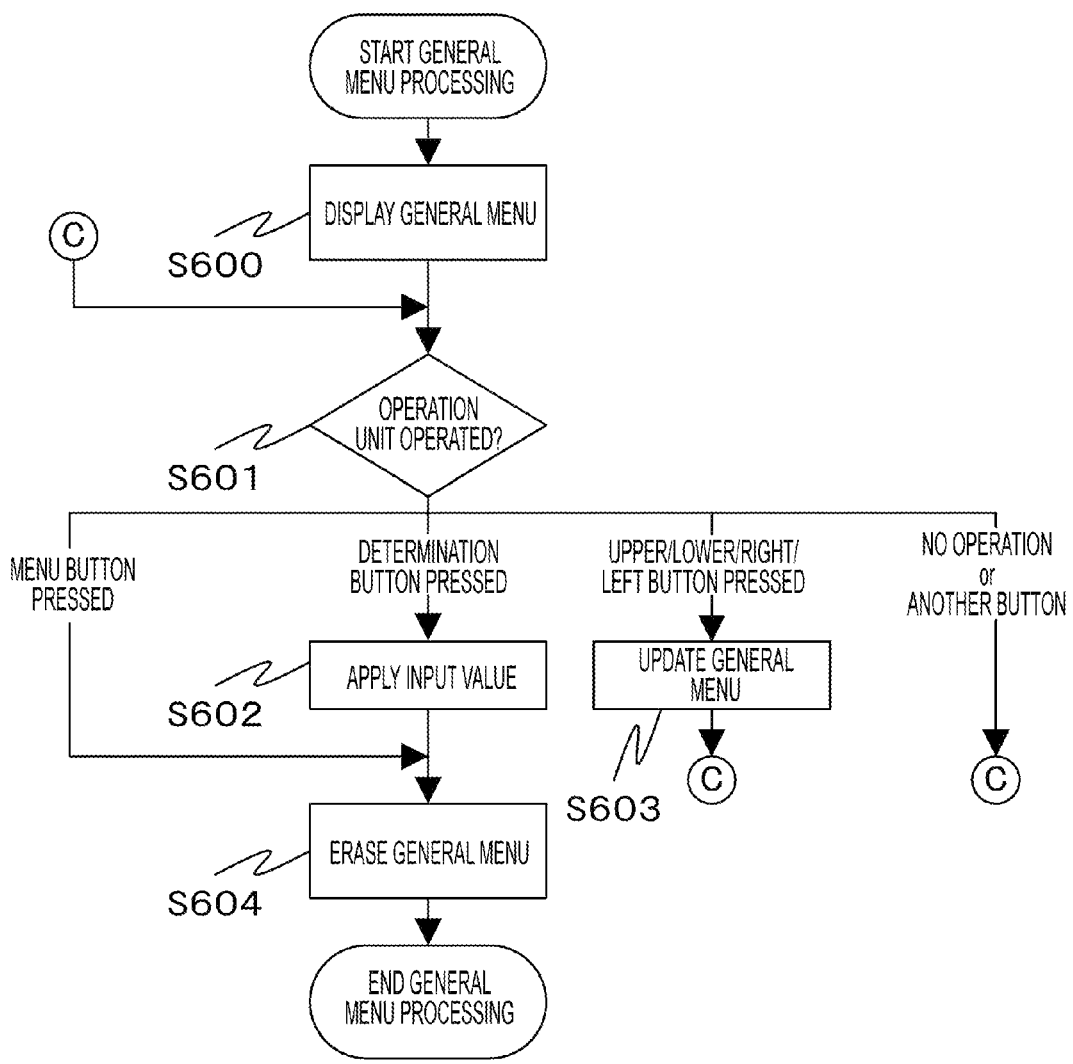
FIGS. 6A and 6B are flowcharts for explaining details of menu processing performed by a liquid crystal projector.

Details of general menu processing at step S513 will be described with reference to FIG. 6A.

Figure 9:
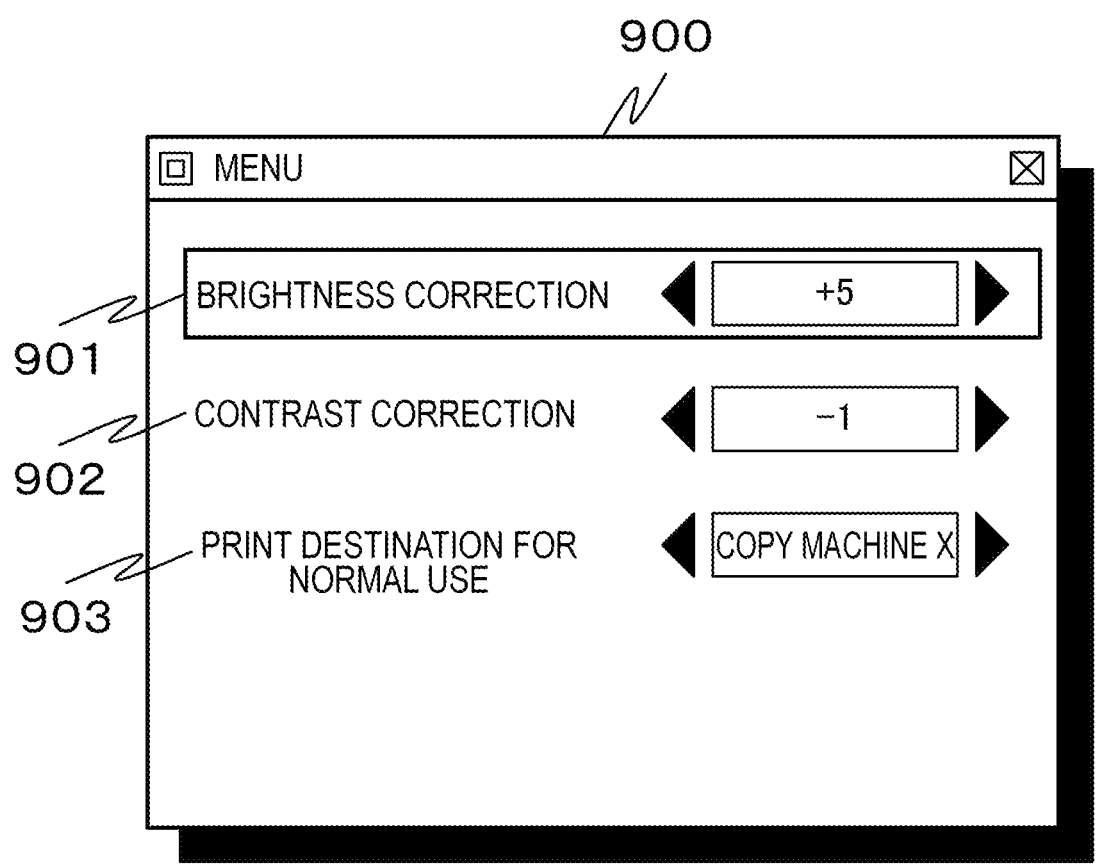
FIG. 9 is a diagram for explaining an exemplary image of a general menu of a liquid crystal projector.

At step S600, the controller 210 generates an image of a general menu. FIG. 9 illustrates an exemplary image of a general menu. A general menu 900 includes three setting items, namely, a brightness correction setting item 901, a contrast correction setting item 902, and a default setting item 903. The controller 210 reads respective setting values stored in the ROM 211, and generates an image on the menu. In the example of FIG. 9, the setting values stored in the ROM 211 are as follows: a setting value corresponding to the brightness correction setting item 901 is "+5", a setting value corresponding to the contrast correction setting item 902 is "−1", and a setting value corresponding to the default setting item 903 is an identifier "copy machine X". Further, a cursor for selecting a setting item which should be focused, among the respective setting items, is displayed. In this stage, as an initial position, the controller 210 displays a cursor at the brightness correction setting item 901. Upon generation of the image of the general menu 900, the controller 210 instructs the image processor 201 to load the image to the menu layer 802.

At step S601, the controller 210 determines whether any operation is made by a user to the operation unit 209.

If it is determined that the menu button 255 is pressed at step S601, the processing proceeds to step S604.

If it is determined that the determination button 254 is pressed at step S601, the processing proceeds to step S602. At step S602, the controller 210 stores, in the ROM 211, the respective values set by the user for the brightness correction setting item 901, the contrast correction setting item 902, and the default setting item 903, and applies the values to the respective units of the projector 100. Specifically, the controller 210 instructs the image processor 201 to apply image processing based on the respective correction values set in the brightness correction setting item 901 and the contrast correction setting item 902, when loading the image to the image layer 800. Then, the processing proceeds to step S604.

If it is determined that any of the upper button 250, the lower button 252, the right button 253, and the left button 251 is pressed at step S601, the processing proceeds to step S603. At step S603, the controller 210 vertically moves the cursor of the general menu 900 or changes the setting value displayed on the menu, according to the pressed button. Specifically, when the upper button 250 is pressed, the cursor is moved upward. When the lower button 252 is pressed, the cursor is moved downward. When the left button 251 is pressed, the set value on the menu of the setting item indicated by the cursor is decremented. This means that as for the brightness correction setting item 901 and the contrast correction setting item 902, the set value is decreased. Regarding the default setting item 903, identifiers of the copy machines are listed in advance, and the identifier is changed to the previous identifier in the list. When the right button 253 is pressed, the set value on the menu of the setting item indicated by the cursor is incremented. This means that as for the brightness correction setting item 901 and the contrast correction setting item 902, the set value is increased. Regarding the default setting item 903, identifiers of the copy machines are listed in advance, and the identifier is changed to the next identifier in the list. Then, the processing proceeds to step S601.

At step S601, if it is determined that no operation is made to the operation unit 209 or that another button is pressed, the processing proceeds to step S601.

At step S604, the controller 210 erases the general menu. Specifically, the controller 210 generates transmissive image data, and instructs the image processor 201 to load the image data to the menu layer 802. Then, the present processing ends.

Figure 6B:
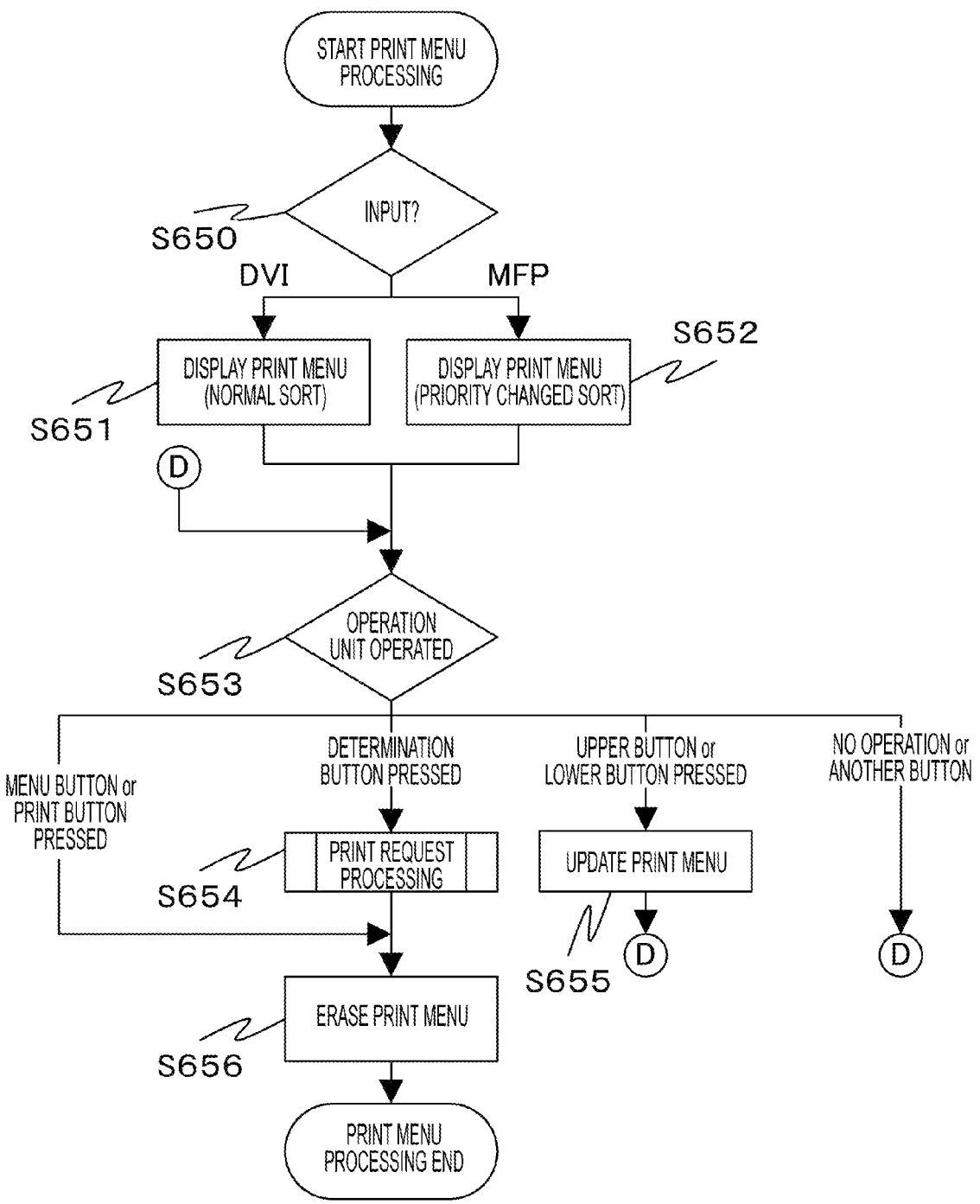

The details of the print menu processing at step S514 will be described with reference to FIG. 6B.

At step S650, the controller 210 determines whether the current input is DVI or MFP, with reference to the value stored in the RAM 212. If it is DVI, the processing proceeds to step S651. If it is MFP, the processing proceeds to step S652.

If it is determined that the current input is DVI at step S650, at step S651, the controller 210 generates an image of a print menu. The controller 210 instructs the image processor 201 to load the image of the print menu to the menu layer 802. The controller 210 generates a list including all of the identifiers obtained at step S502 internally. Regarding the list, the controller 210 sorts the identifiers in such a manner that the identifier of the set value of the default setting item 903, stored in the ROM 211 at step S602, becomes the first, and the other identifiers are put in the dictionary order. The list is embedded in the print menu by the controller 210.

Figure 4A:
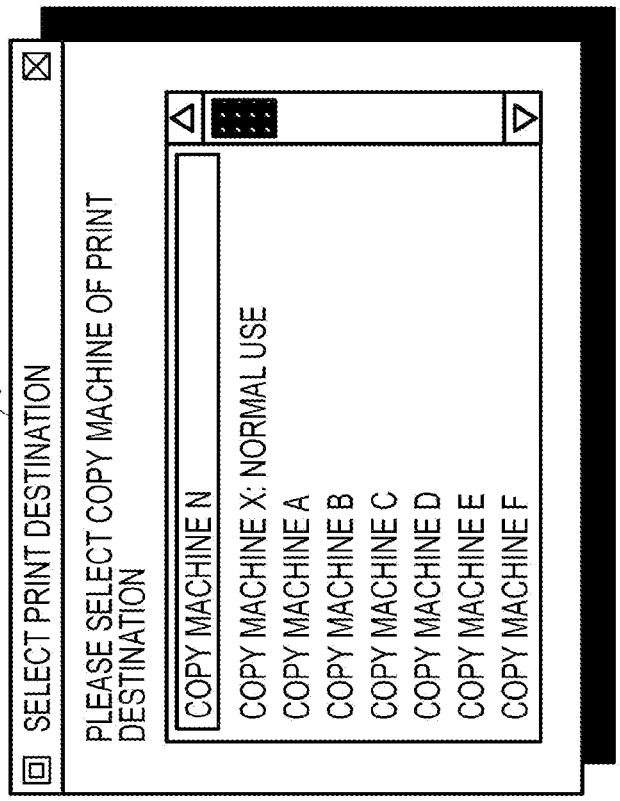
FIGS. 4A to 4F illustrate exemplary images of a print menu of a liquid crystal projector.

A print menu 400a of FIG. 4A is an example of a print menu at step S651. In this example, a set value of the default setting item 903 stored in the ROM 211 is "copy machine X". Further, in the generated list, a range fit in the number of rows of the menu field is imaged. The identifiers unable to be fit in the menu field are to be imaged with a scroll of the display range by a cursor movement made by pressing the lower button 252 or the upper button 250. Further, in the initial position, the controller 210 arranges the cursor position at the first option on the list, which is the default option. In the example described above, the default option is the "copy machine X" which is at the top of the list. Then, the processing proceeds to step S653.

If it is determined that the current input is MFP at step S650, at step S652, the controller 210 generates an image of a print menu. The controller 210 instructs the image processor 201 to load the image of the print menu to the menu layer 802. The controller 210 generates a list of all of the identifiers obtained at step S502 internally in which the identifier in the reception history, stored at step S506, is in high order. The other identifiers are sorted under the same rule as that of step S651.

Figure 4B:
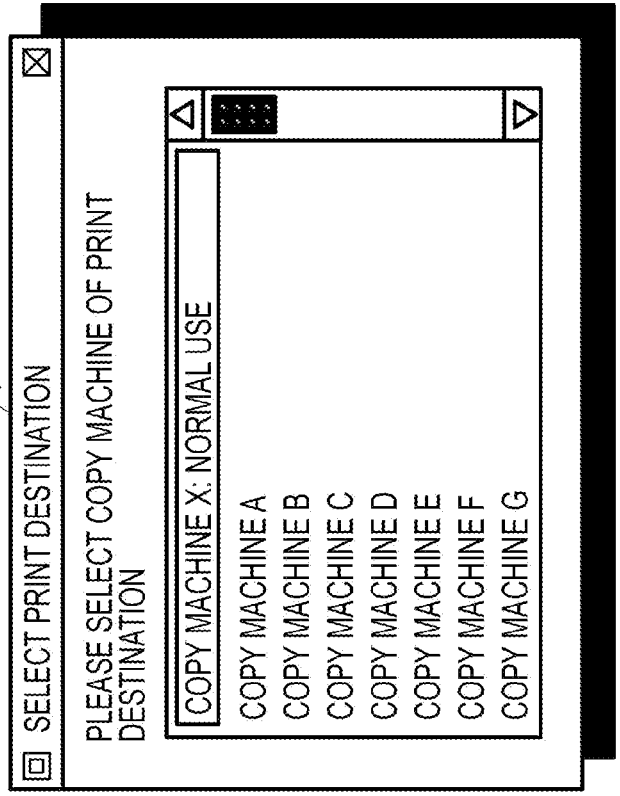
Figure 4D:
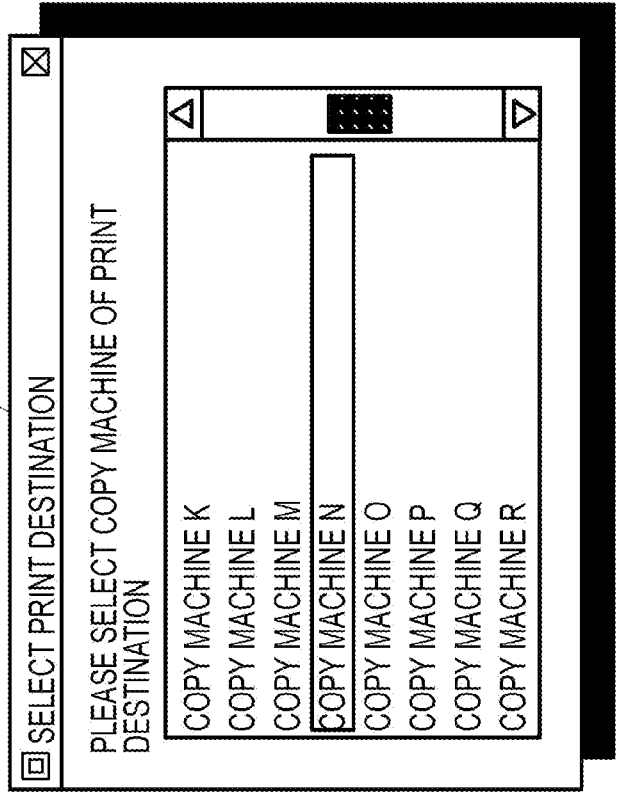
Figure 4C:
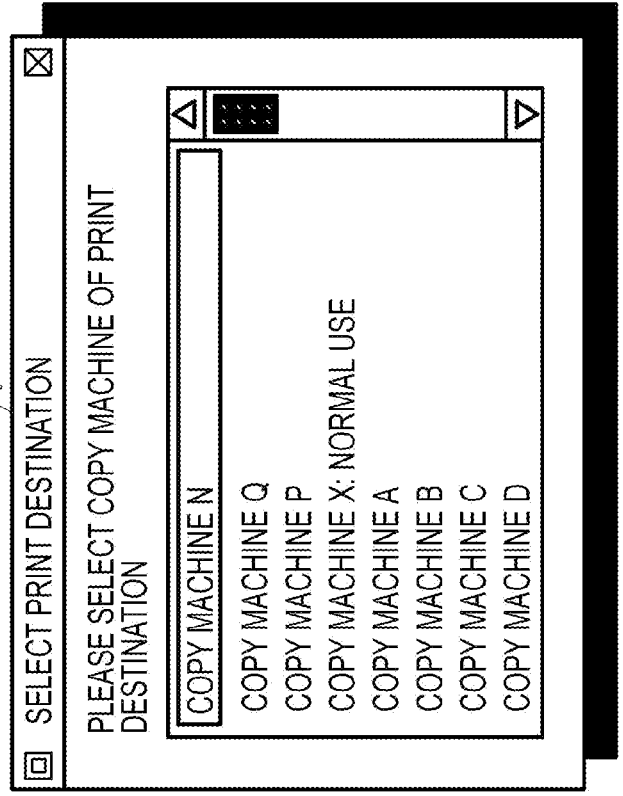

A print menu 400b illustrated in FIG. 4B is an example of a print menu at step S652. This is an example of the case where the "copy machine N" is stored in the reception history. Further, if there are multiple identifiers in the reception history, the controller 210 sorts them such that those having later reception time are in higher order. A print menu 400c of FIG. 4C is an example of another print menu at step S652. This is an example of the case where the "copy machine P", the "copy machine Q" and the "copy machine N" (the latter are the later) are stored in the reception history. Further, in the initial position, the controller 210 arranges the cursor position at the first option on the list, which is set as a default option. In the example described above, the default option is the "copy machine N" which is the latest identifier in the reception history. Similar to step S651, the options that are not fit in the number of rows of the menu field are displayed sequentially with a downward movement of the cursor. Then, the processing proceeds to step S653.

At step S653, the controller 210 determines whether or not an operation is made by a user to the operation unit 209.

If it is determined that the menu button 255 or the print button 256 is pressed at step S653, the processing proceeds to step S656.

If it is determined that the determination button 254 is pressed at step S653, the processing proceeds to step S654. At step S654, the controller 210 transmits a print request to the copy machine of the identifier at the cursor row in the print menu. This processing will be described below in detail. Then, the processing proceeds to step S656.

If it is determined that the upper button 250 or the lower button 252 is pressed at step S653, the processing proceeds to step S655. At step S655, the controller 210 moves the cursor in the print menu upward or downward in accordance with the pressed button. Upon generation of the print menu image after the movement, the controller 210 instructs the image processor 201 to load the image to the menu layer 802. Further, if the cursor row is moved downward in a state where the cursor is at the bottom of the menu field, the display range of the menu is scrolled downward. Similarly, in a state where the cursor is at the top of the menu field, when the cursor row is further moved upward, the display range of the menu is scrolled upward. Then, the processing proceeds to step S653.

At step S653, if it is determined that no operation is made to the operation unit 209 or that another button is pressed, the processing proceeds to step S653.

At step S656, the controller 210 erases the print menu. Specifically, the controller 210 generates transmissive image data, and instructs the image processor 201 to load the image data to the menu layer 802. Then, this processing ends.

Figure 7A:
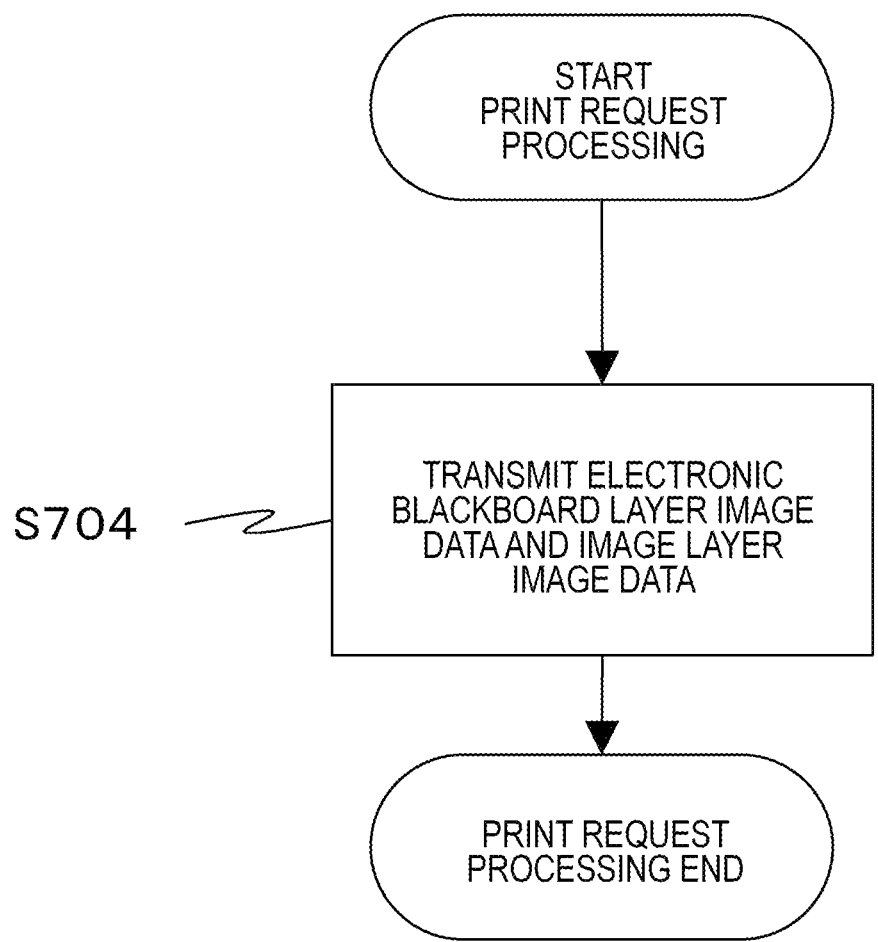
FIGS. 7A and 7B are flowcharts for explaining details of print request processing performed by a liquid crystal projector.

Next, the details of print request processing at step S654 will be described with reference to FIG. 7A.

At step S704, the controller 210 instructs the image processor 201 to obtain image data on the electronic blackboard layer 801 and image data on the image layer 800. Then, the controller 210 transmits the two types of image data along with a print request command to the address of the copy machine of the identifier determined earlier, via the communication unit 207. Thereby, by the copy machine that received them, a composite image of the electronic blackboard layer 801 and the image layer 800 is printed. Then, this processing ends.

In this way, it is possible to change the presented priority of the option representing the copy machine from which the displayed image is transmitted, and display a print destination list.

Here, consideration will be given to scanning a document by a copy machine, transmitting image data to a display apparatus such as a liquid crystal projector and allowing the image data to be displayed, and printing the displayed image. In that case, a person who performs scanning of the document and a person who performs printing of it are the same or those participating in the same conference in most cases. As such, it is highly likely that the location of the copy machine, used for scanning the document, is known to at least the participants of the conference, and that the copy machine is located in an easy-to-use environment. Thus, setting the copy machine used for scanning to be the first candidate of a print destination is valid.

On the other hand, if a signal not coming from a copy machine is displayed, there is a possibility that scanning by a copy machine and a conference using the display apparatus have no relation. As such, selecting a print destination from an existing priority list is valid, rather than setting the copy machine to be the first candidate of a print destination. In the present embodiment, as a print destination for normal use has been set in the default setting item 903, it is preferable to set the print destination as the first candidate.

In this way, a user only needs to select a first candidate in many cases. Thereby, it is possible to reduce the load on the user when selecting a print destination.

Hereinafter, exemplary variations will be described.

The present technology can be carried out even by changing the step S652.

As a first variation, a default option may be set to an option representing an identifier of the latest reception history, while sorting of the identifier list is the same as that of step S651. A print menu 400d illustrated in FIG. 4D is an exemplary print menu in that case. This is an example in the case where the latest log in the reception history is the "copy machine N". This variation also provides an advantage that a user is able to select a valid option easily.

Figure 4F:
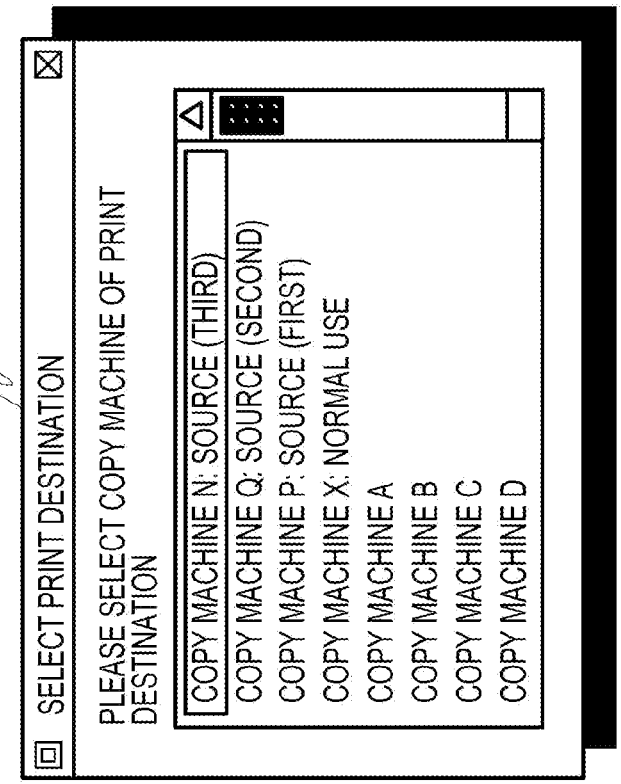
Figure 4E:
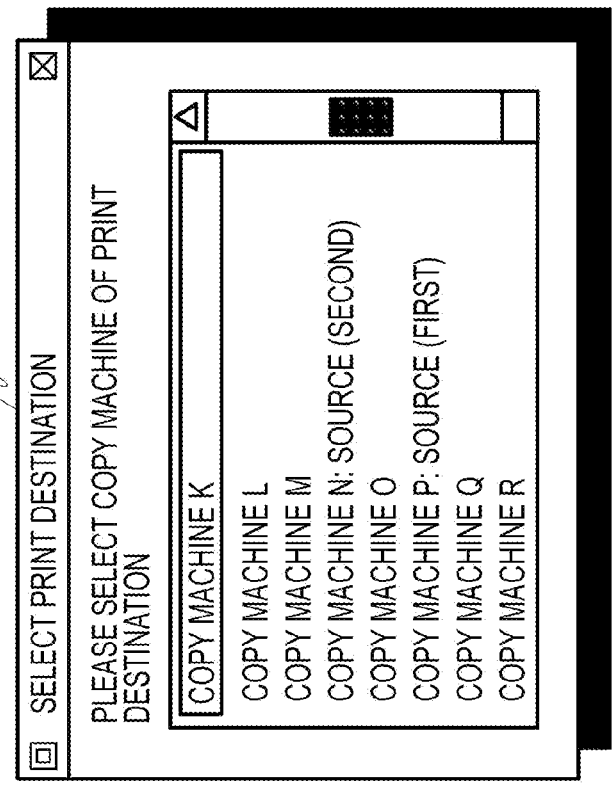

As a second variation, display of options representing the identifiers in the reception history may be highlighted, while sorting of the identifier list is the same as that of step S651. A print menu 400e illustrated in FIG. 4E is an exemplary print menu in that case. This is an example in the case where the reception history includes the "copy machine P" and the "copy machine N" (the latter is the later). In this example, a default option is the "copy machine X" which is at the top of the list. However, by pressing the lower button 252 multiple times so as to move the cursor downward, a character string "source", which is not included in other options, is added to the identifiers included in the reception history and is highlighted. This variation also provides an advantage that a user is able to select a valid option easily.

As a third variation, display of options representing the identifiers in the reception history may be further highlighted, while sorting and the default option are the same. A print menu 400f illustrated in FIG. 4F is an exemplary print menu in that case. This is an example of the case where the reception history includes the "copy machine P", the "copy machine Q", and the "copy machine N" (the latter is the later). A character string "source", which is not included in other options, is added to each of them and is highlighted. This variation also provides an advantage that a user is able to select a valid option easily.

It should be noted that the present technology can be carried out by varying timing of clearing the reception history as described below. Step S510 is changed so as not to clear the reception history in that step. Further, step S511 is changed such that the controller 210 performs DVI setting and clears the reception history. Consequently, the reception history is cleared frequently. Thereby, in a conference, it is possible not to display a copy machine which is a scanning source in another conference. Even in this case, it is possible to reduce the load placed on a user.

Second Exemplary Embodiment

The present technology is applicable even by varying the first exemplary embodiment in the following manner.

The communication unit 207 is changed to receive an image ID for identifying image data, along with the image data, from a copy machine. An image ID is issued as a unique numerical value for each piece of digital data of an image scanned by the controller 312.

Then, to step S505, processing of storing the image ID in the RAM 212 by the controller 210 is added.

Figure 7B:
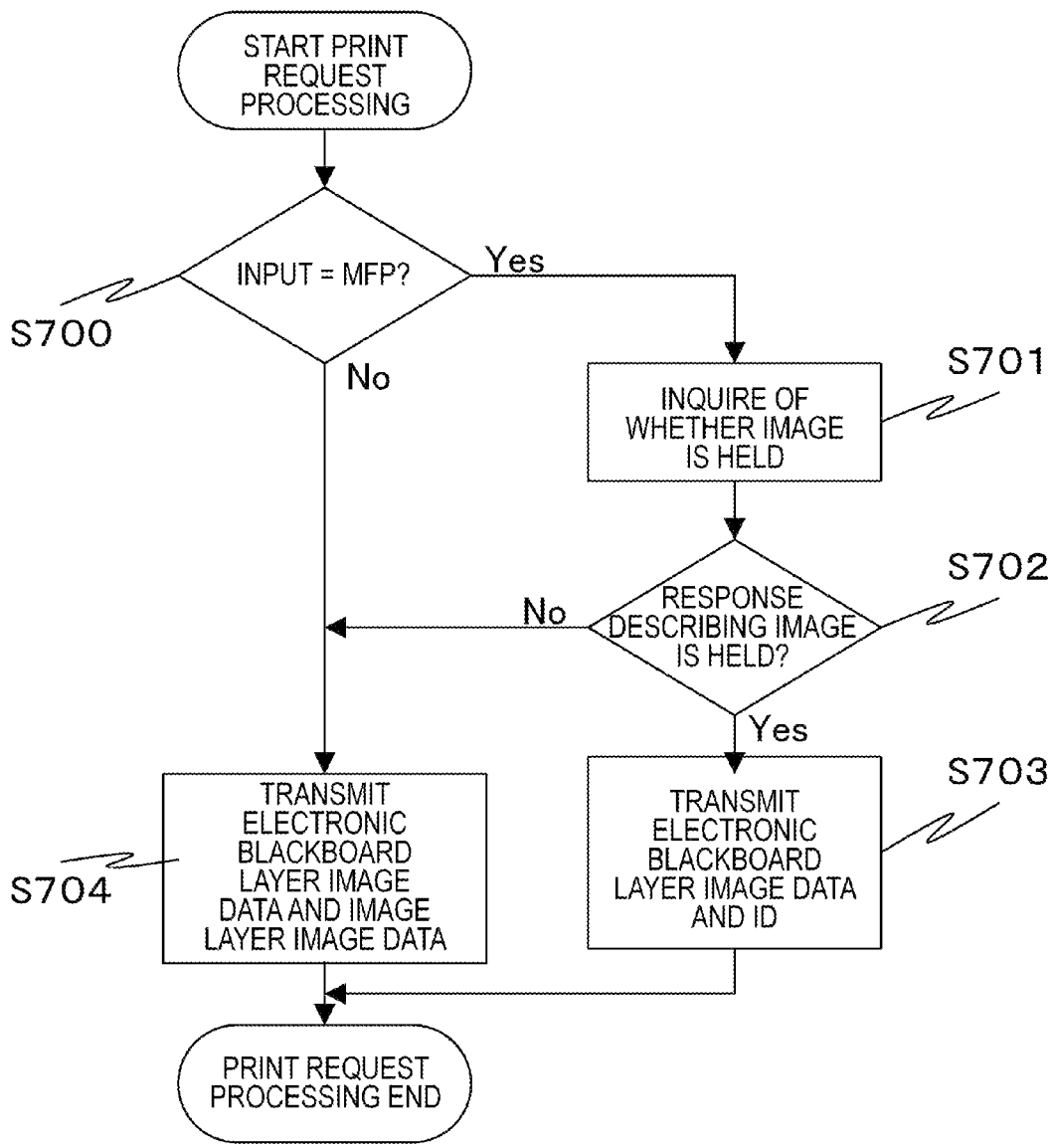

Further, the flowchart of step S654 is changed to that of FIG. 7B.

Details of print request processing at step S654 will be described with reference to FIG. 7B.

At step S700, the controller 210 determines whether or not an input is MFP. If the determination is true, the processing proceeds to step S701. If the determination is false, the processing proceeds to step S704.

If the determination at step S700 is true, at step S701, the controller 210 inquires of the copy machine selected as a print destination whether or not to hold the displayed image, via the communication unit 207. This inquiry is performed by reading the image ID of the displayed image from the RAM 212, and issuing a command inquiring whether an image associated with the image ID is held.

At step S702, the controller 210 determines a response to the inquiry of step S701. If the received response describes that the image is held, the processing proceeds to step S703. If the received response describes that the image is not held, the processing proceeds to step S704.

If the image is held at step S702, at step S703, the controller 210 instructs the image processor 201 to obtain image data on the electronic blackboard layer 801. Then, the controller 210 transmits, to the address of the copy machine of the identifier determined earlier, the image ID and the image data on the electronic blackboard layer 801 along with a command of a print request, via the communication unit 207. Thereby, by the copy machine that received them, a composite image of the image on the electronic blackboard layer 801 and the (displayed) image associated with the image ID is printed. Then, this processing ends.

Meanwhile, step S704 is the same as that of the first exemplary embodiment. Then, this processing ends.

In the exemplary embodiment described above, the communication unit 207 functions as an image receiving unit of the present technology. Further, the liquid crystal panel 205 functions as a display unit of the present technology. Further, the function of displaying the print menus 400b to 400f, under control of the controller 210, serves as a print destination selection unit of the present technology. Further, the function of transmitting a print request to a print destination via the communication unit 207, under control of the controller 210, serves as a print request unit of the present technology. Further, the controller 210 functions as a control unit of the present technology. Further, the image input unit 200 functions as another image receiving unit of the present technology.

In this way, it is possible to reduce the load placed on a user when selecting a print destination, which is the same as the case of the first exemplary embodiment. In addition, as there is no need to transmit image data on the image layer 800, it is also possible to reduce consumption of the network band.

While the present technology has been described above along with various exemplary embodiments, the present technology is not limited to those exemplary embodiments, and changes or the like can be made within the scope of the present technology. The present technology is applicable not only to a liquid crystal projector but also to any devices having a displaying function and a network communication function. For example, the present technology is also applicable to a TV receiver, a PC monitor, a smartphone, or the like.

Other Embodiments

Additional embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-132817, filed Jun. 27, 2014, which is hereby incorporated by reference herein in its entirety.

What is claimed is:
1. A display control apparatus comprising:
a reception unit configured to receive an image;
a display control unit configured to perform control to display the image received by the reception unit;
a presentation unit configured to present candidates for a printing device to be allowed to print a displayed image;
a selection unit configured to select at least one of the candidates for the printing device; and
a transmission unit configured to transmit an instruction to print the displayed image, to the printing device selected by the selection unit, wherein, when the candidates for the printing device include a printing device that transmitted the image, the presentation unit presents the printing device that transmitted the image in preference to other printing devices.

2. The display control apparatus according to claim 1, further comprising:
a search unit configured to search for a printing device existing in a vicinity of the display control apparatus, wherein
the presentation unit presents the candidates for the printing device based on a search result provided by the search unit.

3. The display control apparatus according to claim 1, wherein the presentation unit presents the printing device that transmitted the image in a preselected state.

4. The display control apparatus according to claim 1, wherein the presentation unit presents the printing device that transmitted the image in a state distinguishable from the other printing devices.

5. The display control apparatus according to claim 4, wherein when the candidates for the printing device include a plurality of printing devices that transmitted images, the presentation unit presents the printing devices that transmitted the images in a state distinguishable from other printing devices.

6. The display control apparatus according to claim 1, wherein when an additional image to be associated with the displayed image is input, the transmission unit transmits, to the printing device, an instruction to print a composite image of the displayed image and the additional image.

7. The display control apparatus according to claim 6, wherein the additional image is an image illustrating a track drawn by a pen.

8. The display control apparatus according to claim 1, wherein the printing device that transmitted the image is a multifunction printer.

9. The display control apparatus according to claim 1, wherein the display control apparatus is a projector.

10. A method of controlling an apparatus, the method comprising:
receiving an image;
displaying the received image;
presenting candidates for a printing device to be allowed to print the displayed image;
selecting at least one of the presented candidates for the printing device; and
transmitting, to the selected printing device, an instruction to print the displayed image,
wherein, when the candidates for the printing device include a printing device that transmitted the image, the printing device that transmitted the image is presented in preference to other printing devices.

11. A non-transitory computer readable storage medium storing computer executable instructions that causes a computer to execute a method for controlling an apparatus, the method comprising:
receiving an image;
displaying the received image;
presenting candidates for a printing device to be allowed to print the displayed image;
selecting at least one of the presented candidates for the printing device; and
transmitting, to the selected printing device, an instruction to print the displayed image,
wherein, when the candidates for the printing device include a printing device that transmitted the image, the printing device that transmitted the image is presented in preference to other printing devices.

* * * * *